United States Patent [19]

Welsh et al.

[11] Patent Number: 4,536,358

[45] Date of Patent: Aug. 20, 1985

[54] PROCESS FOR THE PRODUCTION OF HIGH SURFACE AREA CATALYST SUPPORTS

[75] Inventors: Lawrence B. Welsh, Evanston; Richard W. Leyerle, Arlington Heights, both of Ill.

[73] Assignee: UOP Inc., Des Plaines, Ill.

[21] Appl. No.: 510,478

[22] Filed: Jul. 1, 1983

Related U.S. Application Data

[63] Continuation-in-part of Ser. No. 274,333, Jun. 17, 1982, abandoned.

[51] Int. Cl.$^3$ .............................................. B29J 1/00
[52] U.S. Cl. ...................................... 264/81; 427/249
[58] Field of Search .................. 264/81; 427/214, 249

[56] References Cited

U.S. PATENT DOCUMENTS 3,900,540  8/1975  Robba .................................. 264/81

Primary Examiner—James Derrington
Attorney, Agent, or Firm—Thomas K. McBride; William H. Page, II; Raymond H. Nelson

[57] ABSTRACT

Refractory materials which replicate a substantial portion of the internal pore structure as well as the shape and dimensions of high surface area microporous substrate materials which comprise metal or metalloid carbides may be prepared by uniformly depositing a carbide-forming metal or metalloid on the internal surfaces of a high surface area microporous carbon-donor substrate material in the vapor phase. By controlling the operating parameters when depositing carbide-forming metal or metalloid, it is possible to effect a balance between the diffusion rate of the metal or metalloid-containing compound in the structure pores of the substrate with the decomposition rate of the compound, thus obtaining a uniform deposition of the metal or metalloid. If so desired, the substrate material may be subsequently removed by chemical or oxidative means. Examples of high surface area carbon-donor substrate materials which may be employed will include carbonaceous pyropolymers possessing recurring units containing at least carbon and hydrogen atoms per se or composited on a high surface area refractory inorganic oxide such as alumina.

17 Claims, No Drawings

PROCESS FOR THE PRODUCTION OF HIGH SURFACE AREA CATALYST SUPPORTS

CROSS-REFERENCE TO RELATED APPLICATION

This application is a continuation-in-part application of our copending application Ser. No. 274,333, filed June 17, 1982, which is now abandoned and all teachings of which are incorporated herein.

BACKGROUND OF THE INVENTION

Refractory materials which possess the ability to withstand high temperatures form important articles of commerce which are useful in many instances. The refractory materials, due to their hardness as well as resistance to chemical and oxidative processes, are useful as coatings on various substrates, for example protective coatings of silicon carbide, boron carbide, etc. On substrates such as steel, they may be used for rocket nozzles or in places where resistance to abrasion is important. Other uses for this type of material are found in gas turbines or other high temperature applications. In the past, the refractory materials have been deposited on substrates which are of relatively low surface area. In addition, the refractory materials which have been deposited on the substrate material are only deposited on the surface thereof, little or no deposition of the refractory material occurring within the microporous structure of the support. For example, U.S. Pat. No. 3,900,540 discloses a process for preparing a film of a refractory material comprising a substantially defect-free pyrolytic graphite. The pyrolytic graphite is deposited as a film on a substrate by introducing a pre-mixed gas comprising a mixture of a hydrocarbon gas and a diluent gas at a distance above the surface of the liquid substrate and when the hydrocarbon gas contacts the surface, it will decompose to form a pyrolytic graphite film on the surface of the substrate. Another U.S. Patent, namely, U.S. Pat. No. 4,271,235, discloses a method for preparing a polycrystalline silicon. Again, this patent teaches a surface coating comprising a solid substrate body having a base coating disposed on the surface of the substrate body, a layer of carbon disposed on the face of the base coating, and a polycrystalline silicon disposed over the carbon face. Under the conditions which are utilized to prepare these coatings, the resultant composite would contain, as hereinbefore set forth, a polycrystalline silicon or pyrolytic graphite only on the surface of the substrate. For example, U.S. Pat. No. 3,900,540 teaches that the deposition of the pyrolytic graphite source is effected at temperatures ranging from about 900° to about 2100° C., while when using other refractory materials to form a thin film such as boron, a temperature ranging from 600° to about 1500° C. is employed. However, the patent teaches that a limitation on the type of thin film refractory material that can be made by this method is that neither the reactants used to make the refractory material nor the product itself reacts with pyrolytic graphite. This statement appears to be in conflict with a statement set forth in a later portion of the specification that two distinct films of boron carbide and pyrolytic carbide have been discovered which are separated from the substrate surface and from each other.

As will hereinafter be shown in greater detail, it has now been discovered that refractory materials which possess a high degree of resistance to heat, oxidation, etc. may be deposited uniformly as a coating on the internal surfaces of microporous substrates which possess relatively high surface areas whereby the shape and dimensions as well as a substantial portion of the pore structure of the substrate material may be replicated.

BRIEF SUMMARY OF THE INVENTION

This application relates to novel high surface area refractory materials and more specifically to high surface area refractory material replications of a high surface area substrate material.

As hereinbefore set forth, the use of refractory material as a coating on various substrates is an important facet in industry. The refractory materials of the present invention will comprise replications of the pore structure and shape of microporous substrate materials which possess high surface areas and thus the refractory material replications of these substrates will duplicate the physical characteristics of the substrate material, thus enabling the replications to be utilized as catalyst supports or adsorbents where the physical characteristic of high surface area is an important aspect of the material. The high surface area of the microporous substrate materials consists essentially of the internal surfaces of the micropores found in the material.

It is therefore an object of this invention to provide refractory material replications of substrate materials which possess desirable characteristics.

A further object of this invention is to provide a process for preparing high surface area refractory material replications of high surface area microporous substrate materials.

In one aspect an embodiment of this invention is found in a process for the production of a high surface area metal carbide or metalloid carbide under controlled preparation conditions which possesses a physical configuration replicating that of a microporous high surface area carbon-donor substrate consisting essentially of a carbonaceous pyropolymer possessing recurring units containing at least carbon and hydrogen atoms and which itself replicates a highly porous inorganic oxide.

A specific embodiment of this invention is found in a high surface area refractory material replication of a high surface area microporous substrate material which is prepared by depositing a carbide-forming silicon on the internal surfaces of a high surface area carbon-donor substrate material comprising a carbonaceous pyropolymer possessing recurring units containing at least carbon and hydrogen atoms, and which possesses a surface area of the internal pores in the range of from about 1 to about 2000 $m^2/g$, in the vapor phase containing silane at a temperature in the range of from about 375° to 450° C., further heating the resultant composite to form silicon carbide on the surface of said carbonaceous pyropolymer, and recovering the resultant high surface area refractory material.

Other objects and embodiments may be found in the following further detailed description of the present invention.

DETAILED DESCRIPTION OF THE INVENTION

As hereinbefore set forth, the present invention is concerned with a process for the production of high surface area metal carbides or metalloid carbides which are useful as catalyst supports. The high surface area metal carbides or metalloid carbides are prepared by forming a uniform coating of a refractory material on the internal surfaces of a high surface area substrate material which, in the present invention, comprises a microporous carbon-donor substrate. The term "internal surfaces" as used in the present specification and appended claims will refer to surfaces other than those which contribute to the geometric shape of the support. The refractory material which is formed by means of a vapor phase deposition on the hiqh surface area carbon-donor support comprises a metal carbide or metalloid carbide. By utilizing deposition conditions of a type hereinafter set forth in greater detail, it is possible to effect a uniform and rapid deposition of a carbide-forming metal or metalloid on the microporous carbon-donor material to obtain a thin uniform coating within the micropores of the structure which comprises the substrate material. The thus formed material may be utilized as a high temperature catalyst, that is, a catalyst which may be used in reactions wherein the reaction is effected at a temperature in excess of about 1000° C. in a reducing or inert atmosphere. A particular advantage of a catalyst of this type is that the catalyst will possess a high degree of stability as well as possess the ability to remain catalytically active for a long period of time, thus obviating the necessity for regenerating or replacing the catalyst. In addition, it is also contemplated that the materials of the present invention may also be utilized as a support for other catalyst compounds or as an adsorbent material.

One example of a high surface area microporous substrate material which is capable of donating the carbon to form the refractory metal carbide will comprise a carbonaceous pyropolymer which possesses recurring units containing at least carbon and hydrogen atoms deposited on a high surface area inorganic oxide or, in the alternative, the carbonaceous pyropolymer per se. As an example of the former type of high surface area microporous substrate material, it may comprise a composite which has been prepared by pyrolyzing the pyropolymer precursor at an elevated temperature over a refractory oxide which possesses a high surface area, that is, a surface area of the internal pores which ranges from about 1 to about 2000 m$^2$/g. Illustrative examples of refractory oxides which may be used to prepare this material will include alumina in various forms, such as gamma-alumina, eta-alumina, theta-alumina, or mixtures of inorganic refractory oxides such as zeolites, silica-alumina, silica-zirconia, zirconia-titania, zirconia-alumina, etc. The shape of the inorganic oxide may be in any form desired, such as spheres, plates, pellets, rods, fibers, monoliths, powders, etc.

In one method of preparing the composite, the inorganic support such as a refractory oxide is heated to a temperature of from about 400° to about 1200° C. in a reducing atmosphere containing an organic pyrolyzable compound. The organic pyropolymer precursors most commonly and preferably used for the purposes of this invention are members of the group consisting of aliphatic hydrocarbons, aliphatic halogen derivatives, aliphatic oxygen derivatives, aliphatic sulfur derivatives, aliphatic nitrogen derivatives, organometallic compounds, alicyclic compounds, aromatic compounds, and heterocyclic compounds. Of the aliphatic hydrocarbons, the more common classes which may be utilized to perform this invention are alkanes, alkenes, alkynes, and alkadienes. Ethane, propane, butane and pentane are among the alkanes which may be successfully used in the performance of this invention. Similarly, alkenes which suffice include ethene, propene, 1-butene, 2-butene, and 1-pentene. Alkynes which may be successfully used include ethyne, propyne, 1-butyne, 2-butyne, 1-pentyne, and 1-hexyne. 1,3-Butadiene and isoprene are included among the alkadienes which may be utilized. Among the aliphatic halogen derivatives which may be used for the purposes of this invention are the monohaloalkanes such as chloromethane, bromoethane, 1-iodopropane and 1-chlorobutane. Polyhaloalkanes such as carbon tetrachloride, chloroform, 1,2-dichloroethane and 1,2-dichlorobutane may also be utilized. One unsaturated halo compound which may be utilized is chloroprene.

The aliphatic oxygen derivatives appropriate for use in this invention include the classes of alcohols, ethers, halohydrides and alkene oxides, saturated aldehydes and ketones, unsaturated aldehydes and ketones, ketenes, acids, esters, salts and carbohydrates. Various alcohols which may be utilized include ethanol, 2-butanol, 1-propanol, glycol, (e.g., 1,3-propanediol), and glycerol. Ethers utilized include ethyl ether and isopropyl ether. Appropriate halohydrins and alkene oxides include ethylene chlorohydrin, propylene chlorohydrin, ethylene oxide, and propylene oxide. Suitable saturated aldehydes and ketones include formaldehyde, acetaldehyde, acetone and ethyl methyl ketone. Unsaturated aldehydes and ketones which may be used include propenol, trans-2-butenal, and butenone. Ketene has also been successfully used as an organic pyrolyzable substance. Likewise, formic acid, acetic acid, oxalic acid, acrylic acid, chloroethanoic acid, formic anhydride and formyl chloride may also be utilized. Ethers such as methyl formate, ethyl formate and ethyl acetate may also be used. Salts such as sodium formate, potassium acetate and calcium propionate may be utilized as may a variety of carbohydrates. The broad classification of aliphatic sulfur derivatives may be broken down into the subclasses of alkanethiols, alkylthioalkanes, sulfonic acids, and alkyl sulfates and alkyl metallic sulfates. Suitable among the alkanethiols are ethyl mercaptan and n-propyl mercaptan. Among the alkylthioalkanes usable are the thioethers, alkyl sulfides, methyl sulfide, ethyl sulfide and methyl propyl sulfide. Ethyl sulfonic acid and n-propyl sulfonic acid are sulfonic acids which may also be successfully used. Ethyl sulfate and sodium laurel sulfate are also appropriate for use.

The broad class of aliphatic nitrogen derivatives may be broken down into the subclasses of nitroalkanes, amides, amines, nitriles and carbylamines. Nitroethane and 1-nitropropane are exemplary of suitable nitroalkanes while acetamide and propioamide are among the appropriate amides. Amines such as dimethylamine and ethylmethylamine, nitriles such as acetonitrile and propionitrile, and carbylamines such as ethyl isocyanide may also be used for the organic pyrolyzable substance of this invention. Organometallic compounds such as tetraisopropyl titanate, tetrabutyl titanate and 2-ethylhexyl titanate may also be used.

Particularly appropriate and preferred for use as the organic pyrolyzable substance of this invention are the alicyclic compounds. Foremost among these are cyclohexane and cyclohexene. Aromatic compounds include the subclasses of hydrocarbons, halogen compounds, oxygen derivatives, ethers, aldehydes, ketones, quinones; aromatic acids, aromatic sulfur derivatives, and aromatic nitrogen compounds may also be utilized. Among the many suitable hydrocarbons, benzene, naphthalene, anthracene, and toluene were successfully utilized. Benzyl chloride and benzal chloride are appropriate halogen compounds while phenol, o-cresol, benzyl alcohol and hydroquinone are among the suitable derivatives. Ethers such as anisole and phenetole and aldehydes, ketones, and quinones, such as benzaldehyde, acetophenone, benzophenone, benzoquinone and anthraquinone may also be used. Aromatic acids such as benzoic acid, phenylacetic acid, and hydrocinnamic acid may be utilized, while the aromatic sulfur derivative of benzene sulfonic acid will also serve successfully. The aromatic nitrogen compounds of nitrobenzene, 1-nitronaphthalene, aminobenzene and 2-amine toluene may also be successfully used as the organic pyrolyzable substance of this invention. Among the heterocyclic compounds, five member ring compounds such as furan, proline, coumarone, thionaphthene, indole, indigo, and carbazole may be successfully utilized. Six member ring compounds such as pyran, coumarin and acridine may also be utilized.

As can be seen, an extremely wide latitude can be exercised in the selection of the organic pyrolyzable substance, since virtually any organic material that can be vaporized, decomposed and polymerized on the refractory oxide by heating will suffice. The resultant carbonaceous pyropolymer will possess recurring units containing at least carbon and hydrogen atoms; however, depending upon the pyropolymer precursor which has been selected, the pyropolymer may also contain other atoms such as nitrogen, oxygen, sulfur, phosphorus, etc.

In another embodiment, the composite may be prepared by impregnating the refractory inorganic oxide with a solution of a carbohydrate material such as dextrose, sucrose, fructose, starch, etc., and thereafter drying the impregnated support. After drying, the impregnated support is then subjected to pyrolysis temperatures in the range hereinbefore set forth whereby a carbonaceous pyropolymer similar in nature to those hereinbefore described is formed in at least a monolayer on the surface of the refractory oxide support. The resulting composite will possess the carbonaceous pyropolymer which possesses recurring units containing at least carbon and hydrogen atoms on the surface of the support in such a manner so that the carbonaceous pyropolymer will duplicate a substantial portion of the pore structure, both macropore and micropore in nature, of the substrate material and thus retain substantially the same surface area.

Another example of a substrate material which is capable of donating carbon atoms comprises a carbonaceous pyropolymer per se. This type of substrate is obtained by chemically leaching out the inorganic oxide support of the composite hereinbefore set forth. The leaching is effected by treating said composite with either an acid or a base, thereby forming a high surface area microporous carbonaceous pyropolymer support which is a shaped replication of the original inorganic support. The leaching of the base material of the type hereinbefore set forth may be effected over a wide range of temperatures, said range being from about ambient (20°-25° C.) up to about 250° C. or more for a period of time which may range from less than 1 uo to about 72 hours or more. It is to be understood that the operating parameters of the leaching step will vary over a wide range and will be dependent upon a combination of time, temperature, strength of the leaching solution, etc. Examples of acids or bases which may be utilized to leach out the base material, that is, the inorganic support such as a refractory inorganic oxide, will include inorganic acids such as phosphoric acid, sulfuric acid, nitric acid, hydrochloric acid, etc.; organic acids such as methyl sulfonic acid, ethyl sulfonic acid, propyl sulfonic acid, toluene sulfonic acid, etc., strong bases such as sodium hydroxide, potassium hydroxide, lithium hydroxide, rubidium hydroxide, cesium hydroxide, etc. It is to be understood that the aforementioned leaching materials are only representative of the class of compounds which may be used, and that any chemical which is capable of removing the refractory inorganic oxide while retaining the high surface area of the carbonaceous pyropolymer may be used.

Other types of high surface area microporous carbon-donor materials which may be employed as substrates in the process of this invention will include various forms of carbon blacks, activated carbon, activated graphite, charcoal, etc. which possess a surface area of the internal pores within the range hereinbefore set forth, that is, from about 1 to about 2000 $m^2/g$.

The desired high surface area microporous refractory material is prepared by treating a high surface area microporous substrate of the type which has been obtained by the method hereinbefore set forth with a metal or metalloid capable of forming a carbide. In the preferred embodiment of the present invention, the metal or metalloid capable of forming a carbide may be selected from the elements found in Groups IIIB to VIIB inclusively of the Periodic Table, as well as silicon and boron. Of the above metals or metalloids, silicon, boron, tungsten, molybdenum, chromium, vanadium, titanium, tantalum, and zirconium constitute the preferred elements. The deposition of metals or metalloids is effected in the vapor phase at a temperature which may range from about 300° to about 1200° C., depending upon the particular metal or metalloid offering compound which is utilized to deposit a corresponding metal or metalloid on the internal surfaces of the substrate material. It is contemplated within the scope of this invention that any compound which decomposes within the aforesaid mentioned temperature range to offer the metal or metalloid may be employed. Some specific examples of compounds which may be used in the process of this invention will include silicon hydride (silane), silicon chloride, silicon bromide, boron hydride (borane), boron chloride, boron bromide, tungsten chloride, tungsten bromide, molybdenum chloride, molybdenum bromide, titanium chloride, titanium bromide, vanadium chloride, vanadium bromide, chromium chloride, chromium bromide, tantalum chloride, tantalum bromide, etc. It is to be understood that the aforementioned list of compounds is merely representative of the type of compounds which may be employed to afford the desired metal or metalloid on the internal surfaces of the substrate material, and that the present invention is not necessarily limited thereto.

The temperature of deposition of the metal or metalloid capable of forming a carbide which is utilized in the process of the present invention will be below that temperature which has typically been used for chemical vapor deposition of smooth coatings. The temperatures which have typically been used will deposit the metal or metalloid on the outer surface of the substrate material, however, these temperatures do not allow a uniform deposition of the metal or metalloid within the pores of the material. For example, the temperature which has heretofore been employed for the deposition of silicon from silane has been 600° C. or higher. This is in contradistinction to the deposition temperature which is employed in the process of the present invention, that is, from about 375° to about 450° C., the latter temperature range, when employed, permitting a maximum uniform deposition rate on the inner surfaces of the micropores by penetration of the metal or metalloid compound.

Following the deposition of the metal or metalloid on the internal surfaces of the high surface area carbon-donor substrate material, the desired refractory material, which constitutes a metal or metalloid carbide, is prepared by forming the carbide at a temperature in the range of from about 1000° to about 1800° C., said temperature being sufficient to permit the formation of the desired metal or metalloid carbide by combining carbon, which is obtained from the carbon-donor substrate material, with the metal or metalloid.

The high surface area microporous refractory material may be prepared in any suitable manner. For example, a quantity of the high surface area microporous substrate material which acts as a carbon-donor for the formation of refractory metal carbide may be placed in a suitable apparatus such as a tube furnace. The high surface area microporous substrate material is then heated to a temperature within the range hereinbefore set forth, that is, from about 300° to about 1200° C. but below that typically used for preparing smooth coatings of the metal or metalloid, the particular temperature employed being dependent on the particular metal or metalloid which is to be deposited on the internal surfaces of the substrate material. If so desired, the high surface microporous substrate material may be heated to this temperature in an inert atmosphere such as nitrogen, argon, etc. After stabilizing the temperature at the desired value, the metal or metalloid compound which, upon decomposition, will form the metal or metalloid portion of the refractory material, is introduced into the heated apparatus at a controlled rate previously determined which may be in the range of from about 1 ml/min/g of substrate to about 100 ml/min/g of substrate. The decomposition and deposition of the resulting metal or metalloid on the internal surfaces of the high surface area microporous carbon-donor substrate material is effected in the vapor phase and will take place for a period of time which may range from 0.5 up to about 6 hours or more in duration, the amount of metal or metalloid being deposited on the internal surfaces of the high surface area microporous substrate material being dependent upon the final thickness of the refractory metal carbide which is desired for the final product, which in the preferred embodiment of the invention will be typically less than 20 to 30 Angstroms.

By utilizing a deposition temperature within the range hereinbefore set forth, which is below that typically used, as well as a controlled rate of charge, it is possible to obtain a balance between metal or metalloid deposition and decomposition with the diffusion of the reactant to the internal pores so that the metal or metalloid which is to form a metal or metalloid carbide is uniformly deposited on the internal surfaces of the structure pores of the substrate as well as on the surface of the substrate. It is therefore apparent that the quantity of metal which is used may range from a stoichiometric quantity to less than a stoichiometric quantity, depending upon the amount of carbon which is available from the high surface area microporous carbon-donor substrate material to interact with the metal and form the desired refractory metal or metalloid carbide.

As hereinbefore set forth, by utilizing a high surface area carbon-donor microporous substrate material, it is possible to deposit the metal or metalloid on the internal surfaces of the high surface area substrate material in such a manner that the general pore structure of the high surface area substrate material will be replicated and thus permit the obtention of a correspondingly high surface area refractory material.

After deposition of the metal or metalloid on the internal surfaces of the structure pores of the microporous substrate has been completed, the resulting material is allowed to return to room temperature under an inert atmosphere which is afforded by the presence of an inert gas such as nitrogen, argon, helium, etc. and recovered. Following this, the composite is then subjected to a further heat treatment at an elevated temperature within the range from about 1000° to about 1800° C. for a period of time sufficient to permit the formation of the desired metal carbide or metalloid carbide by combining carbon, which is obtained from the carbon-donor substrate material, with the metal or metalloid which has been deposited on the internal surfaces of the pores of the substrate material. The heat treatment, with the attendant formation of the desired carbide, may be effected for a period of time ranging from about 1 to about 6 hours or more in duration, the duration of the treatment being dependent upon the particular parameters of the reaction such as the amount of metal or metalloid deposited on the internal surfaces of the substrate, the particular metal or metalloid which has been selected as well as the degree of temperature which is employed for the formation of the metal carbide or metalloid carbide. Upon completion of the desired residence time, the high surface area refractory material which is capable of being used as a catalyst support is then cooled to room temperature and recovered.

If so desired, the substrate material upon which the refractory carbide is formed may be removed to leave only the metal carbide or metalloid carbide. The removal of the substrate material may be effected in any manner known in the art. For example, when the substrate material comprises a carbonaceous pyropolymer possessing recurring units containing at least carbon and hydrogen atoms composited on the surface of an inorganic oxide such as alumina, the substrate material may be removed by subjecting the composite to a chemical leaching utilizing an acidic or basic substance capable of dissolving the inorganic oxide. The leaching of the inorganic oxide may be effected, as hereinbefore set forth, at a temperature in the range of from about ambient to about 250° C. utilizing an inorganic acid such as phosphoric acid, sulfuric acid; an organic acid such as methyl sulfonic acid, toluene sulfonic acid, etc.; or a basic compound such as sodium hydroxide, potassium hydroxide, etc. When the high surface area microporous carbon-donor substrate material comprises a carbonaceous pyropolymer possessing recurring units containing at least carbon and hydrogen atoms per se, it may be removed by subjecting the composite comprising the metal carbide or metalloid carbide on the surface of said carbonaceous pyropolymer to an oxidation roast at an elevated temperature in the presence of an oxygen-containing gas whereby minor amounts of excess carbonaceous pyropolymer structure are removed. The oxidation treatment is effected at a temperature which may range from about 200° to about 800° C. using oxygen or air as the oxygen-containing gas, said oxidation being effected for a period of time which may range from about 0.5 to about 24 hours or more in duration, said residence time being sufficient to remove the minor amounts of excess carbonaceous pyropolymer.

It is also contemplated within the scope of this invention that the high surface area microporous refractory materials may be prepared in a continuous manner of operation. When such a type of operation is employed, the substrate material, which comprises a high surface area microporous carbon-donor composite, is continuously charged to a heating apparatus such as an oven or furnace wherein it is contacted with the metal or metalloid donor compound while maintaining the temperature of the heating apparatus in a range of from about 300° to about 1200° C. After contact with the metal or metalloid donor compound for a predetermined period of time, the resulting composite is then passed to a second heating zone wherein the composite is treated at a temperature which may range from about 1000° to about 1800° C. for a period of time sufficient to form the corresponding metal carbide or metalloid carbide on the internal surfaces of the substrate material. Thereafter, the high surface area refractory material composited on the substrate material may be recovered as such or, if so desired, it may be continuously charged to a leaching system or an oxidation system wherein the substrate material is removed in a manner similar to that hereinbefore set forth. Thereafter, the high surface area refractory material which replicates the internal pore structure of the substrate material may be recovered.

The following examples are given for purposes of illustrating the high surface area refractory materials of the present invention as well as a process for obtaining these materials. However, it is to be understood that the examples are given merely for purposes of illustration and that the present invention is not necessarily limited thereto.

EXAMPLE I

In this example, a microporous high surface area substrate material was prepared by pyrolyzing benzene at a temperature of 789° C. on the surface of $\frac{1}{8}$" alumina spheres which possessed a surface area of 150 m$^2$/g. After recovery of the material which comprised a carbonaceous pyropolymer possessing recurring units containing at least carbon and hydrogen atoms composited on the surface of the alumina, the material was then subsequently subjected to a leaching step in which the alumina was leached by immersion in a 96% phosphoric acid solution at a temperature of 160° C. for a period of 24 hours. The resulting carbonaceous pyropolymer had an Apparent Bulk Density (ABD) of 0.213, a surface area of 453 m$^2$/g, a pore volume of 1.02 ml/g, an average pore diameter of 90 Angstroms, an average crush strength of 2 kg and a peak crush strength of 9.2 kg.

The desired high surface area refractory carbide material was prepared by placing 6.5 grams of the carbonaceous pyropolymer in a tube furnace and heating the furnace to a temperature of 450° C. under a nitrogen gas flow at a rate of 1600 ml/min. When the temperature had stabilized at 450° C., silane was passed over the substrate material at a flow rate of 75 ml/min and allowed to deposit on the surface for a period of two hours. Following this, the composite was allowed to cool to room temperature under a nitrogen blanket and recovered.

A portion of the composite was then placed in a second furnace and heat treated in a nitrogen atmosphere for a period of three hours at a temperature of 1150° C. At the end of this three hour period, the composite was allowed to cool and was subjected to analysis. X-ray analysis showed the presence of from 40% to 60% of silicon carbide with some silicon metal present. Other analyses disclosed a silicon/carbon atomic ratio of 0.285, a surface area of 208 m$^2$/g, a pore volume of 0.44 ml/g and an average pore diameter of 85 Angstroms in the $\frac{1}{8}$" diameter spheres. In addition, the material had an average crush strength of 2.1 kg and a peak crush strength of 5.4 kg.

A second portion of carbonaceous pyropolymer substrate material was heat treated in an induction furnace at a temperature of 1400° C. for a period of two hours under a nitrogen atmosphere. After recovery of the cooled material, it was subjected to X-ray analysis which detected only silicon carbide. Other analyses showed that the $\frac{1}{8}$" diameter material possessed a surface area of 198 m$^2$/g, a pore volume of 0.50 ml/g and an average pore diameter of 101 Angstroms. In addition, the material had an average crush strength of 2.2 kg and a peak crush strength of 5.5 kg.

EXAMPLE II

In this example, six grams of the carbonaceous pyropolymeric material, which was prepared according to the method set forth in the example above, was placed in a tube furnace and argon was flowed through the furnace at a rate of 300 ml/min. The furnace and substrate material were heated to 400° C. following which silane was flowed through the furnace at a rate of 25 ml/min for a period of six hours. At the end of this time, the material was allowed to cool under an atmosphere of argon and recovered. A portion of the material was recovered and heat treated at a temperature of 1160° C. for a period of six hours under an argon atmosphere. At the end of this period, the resultant microporous high surface area refractory material was recovered and subjected to X-ray analysis. This analysis disclosed only the presence of silicon carbide on the substrate material. The material comprising $\frac{1}{8}$" diameter spheres had a surface area of 236 m$^2$/g, a pore volume of 0.48 ml/g and an average pore diameter of 81 Angstroms. Further analyses disclosed a d spacing of 2.51 Angstroms and a coherence length of only 33 Angstroms which is indicative of a relatively small crystallite size. In addition, the average crush strength of the material was 6.4 kg with a peak crush strength of 13.6 kg.

EXAMPLE III

The high surface area microporous refractory material which was prepared according to Example II above was then placed in a second furnace and subjected to a carbon burn-off to remove excess carbon. The burn-off was effected at a temperature of 600° C. for a period of 20 hours in an oxidation atmosphere comprising air. X-ray analysis showed only silicon carbide on the material which also possessed a surface area of 206 m$^2$/g, a pore volume of 0.65 ml/g, and an average pore diameter of 126 Angstroms. In addition, the d spacing of the $\frac{1}{8}$" diameter spheres was 2.527 Angstroms and a coherence length of 35 Angstroms.

EXAMPLE IV

To illustrate the use of different parameters of temperature and flow rate, six grams of carbonaceous pyropolymer substrate material prepared according to the process set forth in Example I above were placed in a tube furance. Argon was flowed through the furnace at a rate of 300 ml/min and the furnace was heated to 400° C. After stabilization at this temperature, silane was flowed through this furnace at a rate of 25 ml/min for a period of 18 hours. At the end of this period, the composite was cooled in an argon atmosphere and recovered. A portion of the composite material was then heat treated at a temperature of 1160° C. for a period of six hours in an argon atmosphere. At the end of this time, the resultant high surface area microporous refractory material was recovered. X-ray analysis disclosed a coating comprising silicon carbide with about 2% silicon metal present. Other analyses showed that the surface area of the ⅛" diameter spheres was 53 m²/g, the pore volume was 0.13 ml/g with a pore diameter of 98 Angstroms. The material also had an ABD of 0.82 g/ml, a coherence length of 37 Angstroms, as well as an average crush strength of 10.9 kg and a peak crush strength of greater than 20 kg.

The material was then subjected to a carbon burn-off by treatment for 20 hours in an air atmosphere at a temperature of 600° C. The high surface area microporous refractory material was recovered and found to possess a surface area of 42 m²/g, a pore volume of 0.13 ml/g and a pore diameter of 120 Angstroms. In addition, the average crush strength was 8.1 kg with a peak crush strength of greater than 20 kg in the ⅛" diameter spheres.

EXAMPLE V

In this example, a carbonaceous pyropolymer substrate may be prepared according to the process set forth in Example I above. Thereafter, the resulting carbonaceous oyropolymer may be placed in a tube furnace followed by heating the furnace under an argon gas flow. After stabilization of the temperature, boron trichloride may be passed over the substrate material along with hydrogen, and boron may be allowed to deposit on the internal surfaces of the substrate material for a predetermined period. At the end of the desired period, heating may be discontinued and the deposit allowed to cool at room temperature under an argon blanket and recovered. The composite may then be placed in a second furnace and heat treated in an argon atmosphere for a predetermined period while maintaining the furnace at an elevated temperature. At the end of the reaction period, the composite may be allowed to cool and recovered.

EXAMPLE VI

In a manner similar to that hereinbefore set forth, a carbonaceous pyropolymer composited on a high surface area microporous alumina may be prepared in a manner similar to that set forth above, that is, by pyrolyzing benzene on the surface of alumina spheres. This substrate material may then be placed in a tube furnace which may be heated to a temperature of about 1000° C. and a mixture of hydrogen and tungsten chloride passed over the surface of the material for a period of about 3 hours. After recovery of the composite, it may then be heated to an elevated temperature under a nitrogen blanket for an additional period of 3 hours and the desired refractory oxide, comprising tungsten carbide composited on the substrate material, may be recovered.

In a like manner, a high surface area microporous substrate material comprising a carbonaceous pyropolymer possessing recurring units containing at least carbon and hydrogen atoms deposited on silica may be treated with molybdenum chloride or titanium chloride under similar conditions of temperature to deposit molybdenum and titanium on the surface of the substrate. The composite may then be further heated at an elevated temperature under a nitrogen atmosphere and the resulting high surface area refractory material comprising molybdenum carbide or titanium carbide on the surface of the substrate material may be recovered.

If so desired, the substrate material may be removed by subjecting the high surface area microporous refractory material composite to a leaching operation in the presence of hydrofluoric acid at an elevated temperature to dissolve the silica or alumina, following which the minor amounts of excess carbonaceous pyropolymer may be removed by oxidizing the composite at an elevated temperature in the presence of air or oxygen, thus permitting the recovery of high surface area tungsten carbide, molybdenum carbide, or titanium carbide.

EXAMPLE VII

In this example, a high surface area microporous substrate material comprising carbon black which possesses a surface area within the range hereinbefore set forth, may be placed in a tube furnace which may then be heated to an elevated temperature. Thereafter, silane may be passed over the substrate material for a period of time necessary to deposit silicon on the internal surfaces of the carbon black, said deposition being effected in a vapor phase. At the end of the desired time, the resulting composite may then be further heated at a higher temperature under a nitrogen atmosphere for a period of time sufficient to form silicon carbide on the surface of the carbon black.

We claim as our invention:

1. A process for the production of a high surface area microporous metal carbide or metalloid carbide which possesses a physical configuration replicating that of a carbon-donor substrate consisting essentially of a carbonaceous pyropolymer possessing recurring units containing at least carbon and hydrogen atoms and which itself replicates a highly porous refractory microporous inorganic oxide which comprises the steps of:

(a) polymerizing an organic pyrolyzable substance containing at least carbon and hydrogen on the surface of said highly porous high surface area inorganic oxide having an internal surface area in the range of from about 1 to about 2000 m²/g in a reducing atmosphere at a temperature in the range of from about 400° to about 1200° C. to form said carbon-donor substrate consisting essentially of a carbonaceous pyropolymer possessing recurring units containing at least carbon and hydrogen atoms, said carbon-donor substrate replicating said highly porous surface of said refractory inorganic oxide;

(b) uniformly depositing a carbide-forming metal or metalloid on the internal pore surfaces of said carbon-donor substrate which replicates said highly porous refractory inorganic oxide in the vapor phase at a temperature in the range of from about 300° to about 450° C. to afford a maximum uniform deposition of said metal or metalloid on the surfaces within the internal pore structure of said carbon-donor substrate;

(c) heating said carbide-forming metal or metalloid on said carbon-donor substrate at a temperature in the range of from about 1000° to about 1800° C. to permit formation of said high surface area microporous metal carbide or metalloid carbide by reaction of said carbide-forming metal or metalloid with said carbon in said carbon-donor substrate wherein the resultant high surface area microporous metal carbide or metalloid carbide possesses a pore structure and physical configuration replicating the shape and dimension as well as a substantial portion of the pore structure of said carbon-donor substrate, and (d) recovering said high surface area metal carbide or metalloid carbide from said refractory inorganic oxide and said carbon-donor substrate.

2. The process as set forth in claim 1 in which said high surface area inorganic oxide comprises an alumina.

3. The process as set forth in claim 2 in which said alumina is gamma-alumina.

4. The process as set forth in claim 2 in which said alumina is theta-alumina.

5. The process as set forth in claim 1 in which said high surface area inorganic oxide comprises a silica.

6. The process as set forth in claim 1 in which said high surface area inorganic oxide comprises silica-alumina.

7. The process as set forth in claim 1 in which said carbide-forming metal is silicon.

8. The process as set forth in claim 1 in which said carbide-forming metal is tungsten.

9. The process as set forth in claim 1 in which said carbide-forming metal is molybdenum.

10. The process as set forth in claim 1 in which said carbide-forming metal is titanium.

11. The process as set forth in claim 1 in which said carbide-forming metalloid is boron.

12. The process as set forth in claim 1 in which said high surface area refractory inorganic oxide is recovered by chemical removal from said high surface area carbon-donor substrate material.

13. The process as set forth in claim 12 in which said chemical removal is effected by the leaching of said carbon-donor substrate with a substance capable of dissolving said high surface area refractory inorganic oxide.

14. The process as set forth in claim 13 in which said dissolving substance is an acid.

15. The process as set forth in claim 13 in which said dissolving substance is a base.

16. The process as set forth in claim 14 in which said acid is phosphoric acid.

17. The process as set forth in claim 1 in which said carbon-donor substrate comprising a carbonaceous pyropolymer possessing recurring units containing at least carbon and hydrogen atoms is recovered from said metal carbide or metalloid carbide by oxidation.

* * * * *